United States Patent [19]
Dufour et al.

[11] Patent Number: 5,850,604
[45] Date of Patent: Dec. 15, 1998

[54] SYSTEM AND METHOD FOR RESTRICTING CALL SETUP TO A FIXED SUBSCRIPTION AREA IN A CELLULAR TELECOMMUNICATIONS NETWORK

[75] Inventors: Daniel Dufour, Blainville, Canada; Anna Cecilia Brändström, Stockholm, Sweden

[73] Assignee: Telefonaktiebologet LM Ericsson (publ), Stockholm, Sweden

[21] Appl. No.: 431,306

[22] Filed: Apr. 28, 1995

[51] Int. Cl.⁶ ........................................................ H04Q 7/20
[52] U.S. Cl. ............................ 455/435; 455/433; 455/450
[58] Field of Search .................................. 455/33.2, 33.1, 455/33.4, 34.1, 433, 432, 435, 450; 379/59, 60

[56] References Cited

U.S. PATENT DOCUMENTS

| | | | |
|---|---|---|---|
| 5,235,632 | 8/1993 | Raith | 379/59 |
| 5,293,641 | 3/1994 | Kallin et al. | 455/33.1 |
| 5,521,961 | 5/1996 | Fletcher et al. | 379/59 |

FOREIGN PATENT DOCUMENTS

A0 505 105  9/1992  European Pat. Off. .

Primary Examiner—Edward F. Urban
Assistant Examiner—Darnell R. Armstrong
Attorney, Agent, or Firm—Steven W. Smith

[57] ABSTRACT

There is disclosed a system and method for accessing a cellular telecommunications network serving a plurality of normal subscribers and a plurality of fixed subscribers. The normal and fixed subscribers access the system through a plurality of cells and a plurality of base stations electronically connected to a mobile switching center (MSC). Each of the base stations transmits radio frequency signals over a coverage area defining one of the cells. The system differentiates during system access the normal subscriber from the fixed subscriber. The system permits the normal subscriber access to the system through any one of the plurality of cells. The system permits the fixed subscriber restricted call setup to the system through a fixed subscription area (FSA) defined for the fixed subscriber to include at least one of the cells. The system includes a redirection access function for redirecting access to the system by the fixed subscriber to one of the cells in the FSA when the fixed subscriber initially accesses the system through a serving cell excluded from the FSA. A fixed subscriber who travels near or slightly outside cell coverage area of the FSA is able to access the cellular system by redirecting the access to a cell defined as part of the subscriber's FSA.

31 Claims, 3 Drawing Sheets

SYSTEM AND METHOD FOR RESTRICTING CALL SETUP TO A FIXED SUBSCRIPTION AREA IN A CELLULAR TELECOMMUNICATIONS NETWORK

FIELD OF THE INVENTION

The present invention relates to cellular radio telecommunication systems and, more particularly, to a system and method for restricting call setup to a fixed subscription area in a cellular telecommunications network.

BACKGROUND OF THE INVENTION

As the use of cellular telephones spreads, the number of network operators who compete to provide telecommunication services to subscribers is also increasing. Each operator, moreover, desires to offer unique services which distinguish the operator from its competitors. One such way to distinguish the service provided to subscribers is to offer increased levels of individual service tailoring. Today, only limited tailoring of individual services has been implemented. For example, operators may now offer subscribers a choice of subscription areas such as having cellular service only in a downtown area, or for a higher cost, having service which includes both the downtown area and the suburbs as well. Subscribers with limited geographically or cell coverage access rights are referred to as "fixed subscribers" and are generally equipped with a cellular telephone that may be either a "fixed cellular terminal" or a "mobile station". The cellular system is programmed with information that indicates that a fixed subscriber is limited to operating within the subscriber's restricted or fixed subscription area (FSA). An FSA is defined as one or more regions of cells within which fixed subscribers are allowed to roam, receive and place calls.

Existing cellular systems perform a verification process to determine if a fixed subscriber is authorized to place or receive a call from the cell in which the subscriber is located. The verification process is performed at system access, i.e., call origination or termination. A major problem occurs near cell borders because the fixed subscriber's cellular telephone may access the cellular system is through more than one cell not forming part of the subscriber's FSA. The cellular telephone attempts to access the cellular system by rescanning to lock onto an access channel from which the cellular telephone receives the strongest signal. Should this access channel be serviced by a cell outside the subscriber's FSA, then access to the cellular system is denied. Access can also be denied when the operator has not assigned a cell to the subscriber's FSA that should have been assigned to the FSA. For example, when the subscriber is normally or frequently located in areas of overlapping cell coverage and one of the overlapping cells is not assigned to the subscriber's FSA, there may be instances where the access is denied.

System operators obviously lose revenue when a fixed subscriber is denied access to the cellular system due to the subscriber not accessing a cell forming part of the subscriber's FSA. Also when a fixed subscriber is improperly denied access to the cellular system customer satisfaction is diminished.

U.S. Pat. No. 5,293,641 issued Mar. 8, 1994 to Kallin et al teaches an unrestricted directed retry function which redirects a subscriber to another cell for service when the cell the subscriber is accessing is congested. By congestion it is meant that all the voice channels of the cell are in use. Kallin et al does not teach or suggest denying subscriber access to the congested cell.

It would be a distinct advantage to have a cellular radio telecommunication system with the capability of permitting a fixed subscriber who travels near or slightly outside cell borders of its defined FSA to be able to access the cellular system by redirecting the subscriber's access to a cell within the subscriber's FSA. The present invention provides such a system.

SUMMARY OF THE INVENTION

The present invention is directed to a telecommunications system having a redirection access function for redirecting access of a fixed subscriber. The fixed subscriber access is redirected to at least one cell included in the subscriber's defined FSA when the fixed subscriber accesses the telecommunications system through a serving cell that is a neighbor cell to the cells defined in the FSA.

In accordance with an aspect of the present invention there is provided a cellular telecommunications system having a plurality of cells and a plurality of subscribers. The plurality of subscribers includes at least one fixed subscriber having a cellular telephone and being assigned restricted call setup to the system through a fixed subscription area (FSA) including at least one of the cells. The system comprises a mobile switching center (MSC), and a plurality of base stations electronically connected to the MSC. Each of the base stations transmits radio frequency signals over a coverage area defining one of the cells. The system further comprises a redirection access function for redirecting access of the fixed subscriber to the at least one cell included in the FSA when the fixed subscriber accesses the telecommunications system through a serving cell including one of the plurality of cells excluded from the FSA.

Advantage is found with the present invention because it allows a fixed subscriber to access the telecommunications system when the subscriber is located adjacent to or just beyond its FSA. It also permits the fixed subscriber access to the cellular system when the subscriber is located in areas of overlapping cell coverage when one or more of the cells providing overlapping coverage is not defined to be within the subscriber's FSA.

Throughout the disclosure and claims, reference is made to the terms "redirection access" and "redirecting access". It should be understood that when reference is made to these terms it is meant the cellular telephone of the subscriber is directed by the MSC to retry service access request to the one or more cells within the subscriber's FSA (Directed Retry message). In response to the Directed Retry message, the cellular telephone monitors received signal strengths on each of the identified channels and selects the strongest received channel to reattempt service access request.

It is envisaged that the redirection access function is located within the MSC or within the MSC and its associated base stations. Further, the redirection access function includes means for determining if the redirection access function is active in the serving cell. The redirection access function may further include means for determining if a neighbor cell to the serving cell is one of the cells in the FSA. The redirection access function may further include means for redirecting subscriber access from the serving cell to the neighbor cell when the neighbor cell is one of the cells in the FSA. It is envisaged that the means for determining if the neighbor cell is one of the cells in the FSA involves checking neighbor cells surrounding the serving cell.

In accordance with another aspect of the present invention there is provided in a cellular telecommunications system having a plurality of cells and a plurality of subscribers, the plurality of subscribers including at least one fixed subscriber having a cellular telephone and being assigned restricted call setup to the system through a fixed subscription area (FSA) including at least one of the cells, a method of redirecting access of the fixed subscriber to the at least one cell included in the FSA when the fixed subscriber accesses the telecommunications system through a serving cell not forming part of the FSA, the method comprising the steps of:

determining whether at least one neighbor cell to the serving cell is one of the cells in the FSA; and, redirecting the subscriber access from the serving cell to the at least one neighbor cell when the at least one neighbor cell is determined to be one of the cells in the FSA.

BRIEF DESCRIPTION OF THE DRAWINGS

For a better understanding of the nature and objects of the present invention reference may be had to the accompanying diagrammatic drawings in which.

DETAILED DESCRIPTION

The present invention comprises a cellular radio telecommunications system which detects whether a subscriber has any cell coverage restrictions in accessing the system. If the subscriber has a cell coverage restriction in accessing the system, then the system determines if the subscriber is within its authorized fixed subscription area (FSA) or outside the FSA. If this subscriber is within its FSA, then access is permitted and a call can be setup through this cell. If this subscriber is outside its FSA, then the system determines if there is a neighbor cell that is part of the FSA to the cell initially accessed. If this initial cell has a neighbor cell forming part of the FSA, the cellular telephone of the subscriber is directed by the MSC to retry service access request to the one or more neighbor cells within the subscriber's FSA. In the analog control channel (ACC) of AMPS, D-AMPS and IS 136.2 Standards, the directed to retry service access request is implemented by sending to the cellular telephone a Directed Retry message identifying the channels of the neighbor cells that are part of the subscriber's FSA. In response to the Directed Retry message, the cellular telephone monitors received signal strengths on each of the identified channels and selects the strongest received channel to reattempt service access request. It should be understood that with slight modifications a similar implementation of the Directed Retry message could be sent to the cellular telephone on a digital control channel (DCCH). In this implementation the Directed Retry message identifies which cells of the neighbor cells are part of the FSA and should be considered directed retry cells.

Figure 1:
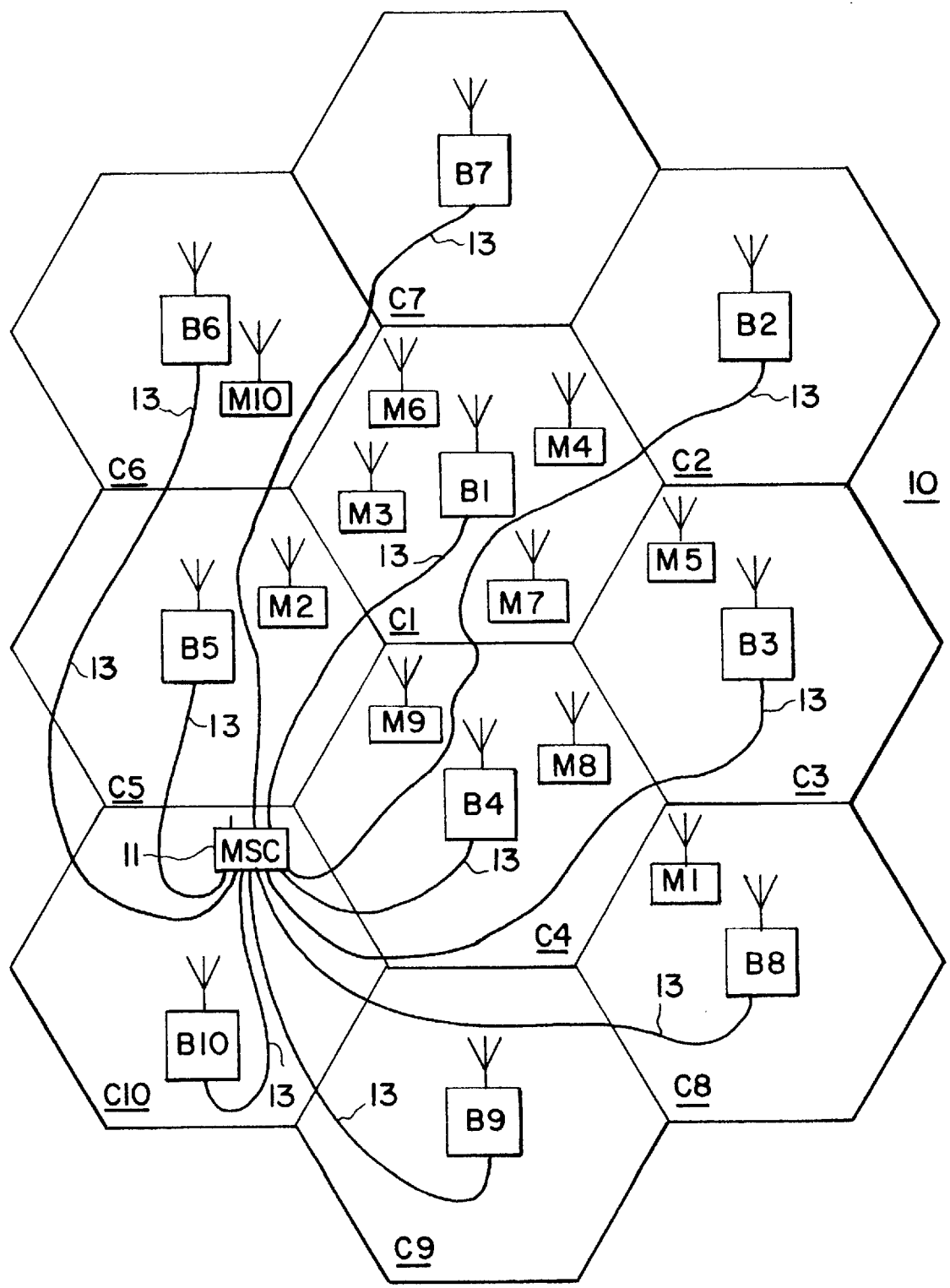
FIG. 1 (Prior Art) is a block diagram illustrating components of a cellular radio telecommunications system associated with the present invention.

Referring to FIG. 1, there is illustrated a cellular radio communications system of the type to which the present invention generally pertains. In FIG. 1, an arbitrary geographic area is divided into a plurality of contiguous radio coverage areas, or cells C1–C10. Although the system of FIG. 1 is illustratively shown to include 10 cells, it should be understood that in practice, the number of cells would be much larger. Cells C1 to C10 are illustrated to be accepted conventional hexagram drawings. Further, while the coverage of these cells is shown to be contiguous, normally, the coverage of the cells overlaps at the cell borders.

Associated with and located within each of the cells C1–C10 is a base station designated as a corresponding one of a plurality of base stations B1–B10. Each one of the base stations B1–B10 includes a transmitter, a receiver, and base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may cover the cells C1–C10 with radio signals either omnidirectionally or directionally. Therefore, the representation of the cellular radio system of FIG. 1 is for purposes of illustration only and is not intended as a limitation on the possible implementations of the cellular radio system within which the method and system of the present invention may be implemented.

FIG. 1 further illustrates, a plurality of mobile stations M1–M10 which may be found within the cells C1–C10. Only 10 mobile stations are shown in FIG. I but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and even from one cellular radio system served by a mobile switching center to another such system.

Each of the mobile stations M1–M10 is capable of initiating or receiving a telephone call through one or more of the base stations B1–B10 and the mobile switching center (MSC) 11. Such calls may be either voice or data communication. The MSC 11 is connected by communication links 13 (e.g. cables) to each of the illustrative base stations B1–B10 and to a fixed public switched telephone network PSTN or a similar fixed network which may include an integrated system digital network (ISDN) facility. The relevant connections between the mobile switching center MSC 11 and the PSTN or ISDN, are not shown in FIG. 1 but are well known to those of ordinary skill in the art.

Each of the cells C1–C10 is allocated a plurality of voice or speech channels and at least one access or control channel such as a forward access control channel (FOCC). The control channel is used to control or supervise the operation of mobile stations by means of information transmitted to and received from those units. Control and administration messages within a cellular radio system are sent in accordance with industry established air interface standards, such as AMPS and EIA/TIA 553, the standards for analog cellular operations, and/or D-AMPS, IS-54B, and the proposed IS-136, the standards for digital cellular operations, all of which are hereby incorporated by reference herein. While these standards govern North American operations, similar standards govern other geographic areas throughout the world, and are well known to those skilled in the art.

The information exchanged between base stations and mobile stations via messages may include incoming call signals, outgoing call signals, paging signals, paging response signals, location registration signals, voice channel assignments, maintenance instructions, handoff instructions and cell reselection instructions as a cellular telephone travels out of the radio coverage of one cell and into the radio coverage of another cell. The control or voice channels may operate either in an analog or digital mode or a combination thereof based upon industry standards. Integrated services between different cellular telecommunication systems are provided by using the intersystem specification IS-41, which is hereby incorporated by reference.

In cellular telecommunication systems in which most control functions are centralized at the MSC 11, the Redirect Access process may be implemented at the MSC. In cellular telecommunication systems in which the control functions are more distributed, the Redirect Access process may be implemented partially at the MSC 11 and partially at the systems base stations B1–B10. The description herewith focuses on implementation at a MSC 11, although a distributed implementation is also considered to be within the scope of the invention.

Figure 2:
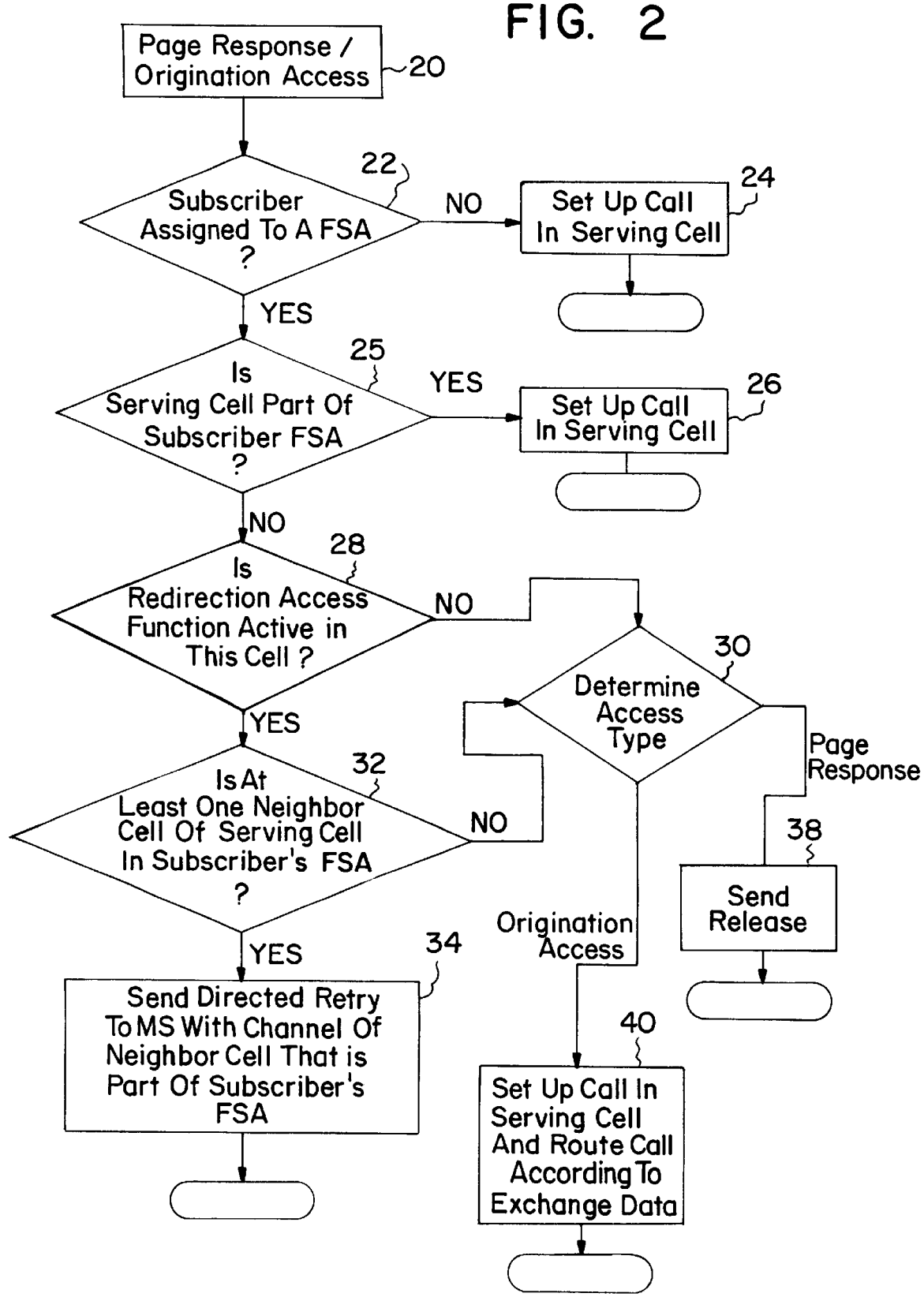
FIG. 2 is a flow chart illustrating the functions performed by the Redirect Access process in the preferred embodiment of the present invention; and, FIG. 3 is a block diagram similar to FIG. 1, except that it shows an FSA and how the subscriber gains access to the telecommunications system by the Redirect Access process of the preferred embodiment.

Referring to FIG. 2, the preferred process for the Redirection Access process of the present invention is described. In FIG. 2 at step 20 a subscriber attempts to access the network through setting up a voice or data channel with the network. Access to the network may be in the form of a call being initiated through the telecommunications system to the subscriber and the subscriber responding with a page response. This is also known as terminating access. Alternatively, the subscriber at step 20 may be attempting an origination access to the telecommunications system. These accesses may be attempted on an ACC or a DCCH.

Upon attempting to access the cellular system, the MSC 11 checks to determine if the subscriber is assigned to a fixed subscription area (FSA). This is represented by step 22 in FIG. 2. It should be understood that the subscriber's user profile may be stored in a home location register (HLR) to which the MSC forwards an inquiry to determine if the subscriber is a fixed subscriber. Should the subscriber be a fixed subscriber, the HLR informs the MSC of the cells within the cellular system in which the fixed subscriber may place a call. In the event the MSC determines that the subscriber is not a fixed subscriber and hence may place a call within any cell serving the MSC, the MSC allows the call to be setup at step 24 to the cell which has received the origination access request.

In the event the MSC 11 determines that the subscriber has been assigned an FSA, then at step 25 the MSC determines whether the subscriber is accessing a cell that forms part of its FSA. In the event the serving cell is part of the subscriber's FSA, the call is setup in step 26.

When the subscriber accesses a cell not forming part of its FSA, the MSC at 28 determines if this cell has an activated Redirection Access function associated with it. In the event this cell does not have the Redirection Access function active, then the process moves to step 30 which is described later in more detail. In the event this cell has the Redirection Access function active, then the MSC checks surrounding neighbor cells to determine if any neighbor cell is part of the subscriber's FSA. This is done at step 32. If no neighbor cell exists that is part of the subscriber's FSA, the MSC performs step 30 which will be described in more detail later. In the event the MSC at step 32 determines that there is a neighbor cell which forms part of the subscriber's FSA, then the cellular telephone is directed to retry service access request at step 34 to one or more neighboring cells forming part of the FSA.

In the event that the Redirection Access function is determined not to be active at step 28 or in the event that there are no neighbor cells to the serving cell in the subscriber's FSA as determined at step 32, then the MSC moves to step 30. In step 30, the MSC determines if the access to the cellular system is an origination access from the subscriber or a page response from the subscriber responding to a terminating access. In the event that the access is a page response, then the call will not be setup to the subscriber and the MSC sends a release message to the base station at step 38. In the event the call is an origination access type from the subscriber, then the MSC sets up the call in the serving cell and routes the call according to exchange data at step 40. The exchange data may have the telecommunications network inform the subscriber that the call cannot be completed because the subscriber is trying to access the telecommunications system from outside of its FSA. Alternatively any other appropriate message may be provided to the subscriber.

Figure 3:
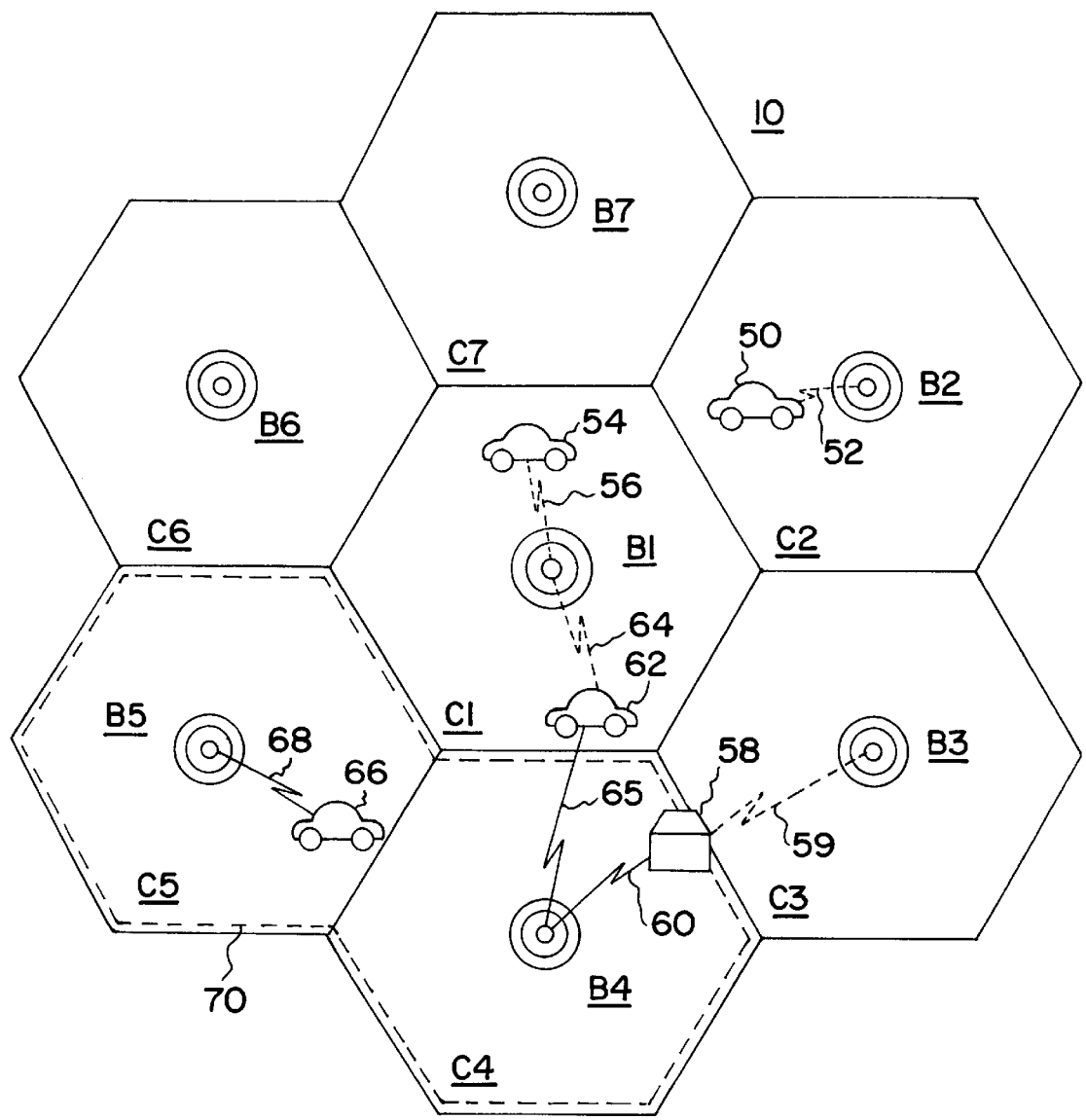

Referring to FIG. 3, there is shown a block diagram similar to FIG. 1 but in this diagram only a portion of the cells are shown. This figure will be used to exemplify the manner in which the steps of the process previously described in FIG. 2 of the present invention may function. In this figure, the cells and base stations have the same numbers as in FIG. 1 however, the base stations are shown as three concentric circles. Subscriber locations 50, 54, 62 and 66 in this drawing represent a single subscriber who has a mobile station that is roaming within the cellular telecommunications system 10. Subscriber location 58, represents a subscriber who has a fixed cellular terminal.

In the event that the mobile subscriber is not assigned an FSA then the mobile subscriber may setup all the calls as shown by the call setup lines (ACC or DCCH) 52, 56, 64, 65, and 68. However, for the purposes of illustration and exemplification the mobile and fixed subscriber are defined to each have an FSA shown by the dotted lines 70 which include cells C4 and C5.

When the subscriber is at location 50 in cell C2 and attempts to access the telecommunications system 10 through ACC or DCCH 52, the MSC checks at step 22 of FIG. 2 to find out that this subscriber has been assigned an FSA and then checks at step 25 to determine whether the subscriber is accessing a cell that is not part of the subscriber's FSA. The MSC determines if the Redirection Access function is active in this cell. If it is not active, then ultimately the call is denied because the subscriber 50 is outside of its FSA. If the Redirection Access function 28 is active in this cell, then the MSC checks the neighboring cells of cell C2 including cells C7, C1 and C3 to see if these three cells form part of the FSA. Because these three cells do not form part of the FSA, then the MSC reverts to step 30 to determine the type of access.

When the subscriber is located in location 66, the cellular telephone, which is illustrated as a mobile station, accesses base station B5 of cell C5 because the subscriber at location 66 is positioned within its FSA 70. The MSC determines this at step 25 of the process in FIG. 2.

If the subscriber is located in location 54 in cell Cl, the subscriber accesses base station B1 of cell C1. The MSC in FIG. 2 determines at step 22 that the subscriber has been assigned an FSA. At step 25, the MSC determines that this subscriber is not located within its subscriber FSA, and assuming that the Redirection Access function is active, the MSC checks all neighboring cells to determine if these neighboring cells are part of the subscriber's FSA. In this event, the MSC determines after checking cells C4, C5, C6, C7, C2 and C3 that cells C4 and C5 are part of the FSA. In this scenario, the MSC sends a redirected retry message to the subscriber 54 through the control channel associated at 56 with B1 and redirect the subscriber 54 to access either cell C5 or cell C4 depending on the cell reselection made by the mobile station. In this scenario no connection to the base stations B4 and B5 is shown because it is assumed that subscriber 54 experiences poor signal strength due to its distance from these FSA base stations.

When the subscriber is located in location 62 as shown in cell Cl, the subscriber 62 attempts to setup or access the network through ACC 64 to base station B1. In this scenario, the MSC goes through steps 22, 25, 28 and 32 of FIG. 2 and ends up sending a directed retry in step 34 to the MS with the access channels for cells C4 and C5. An access channel 65 to base station B4 occurs when this is the strongest signal. This scenario shows that the subscriber 62 may access its FSA 70 when the subscriber is just beyond the border of the FSA 70. It should be understood that in certain instances the subscriber 62 may be able to access its FSA when the subscriber is at a considerable distance beyond the FSA border.

An additional advantage of the present invention is realized when the subscriber is located at location 58 shown to be on the border between cells C3 and C4. In this instance, instead of illustrating a mobile station for the cellular telephone, as at 50, 54, 62 and 66, a fixed cellular terminal 58 is illustrated. This fixed cellular terminal may be, for example, a cellular telephone mounted to a wall in a house. A fixed cellular terminal is to be contrasted to a mobile station. Further, it should be understood that a fixed subscriber is a subscriber who has restricted access to the telecommunication system through limited cell coverage. Accordingly, it is possible that a fixed subscriber is either a user of a fixed cellular terminal or a mobile station. Referring again to fixed cellular terminal 58, because border coverage overlaps between cells C3 and C4, it is likely that the subscriber in location 58 could access either base station B3 of cell C3 or base station B4 of cell C4. If access is allowed to station B4, then the Redirection Access function is not required. However, due to various forms of interference which are well known in the art, it is likely that the fixed cellular terminal at location 58 may scan either the ACC or DCCH and determine that station B3 gives a greater signal strength reading. In this instance, the MSC goes through step 22 to determine that the subscriber at location 58 has been assigned an FSA. The MSC then at step 25 determines that the serving cell C3 is not part of the FSA. At step 28, the FSA determines that the cell C3 has its Redirection Access function active and at step 32 determines if one of the neighboring cells is part of the FSA. The MSC determines that cell C4 is a neighboring cell to cell C3 and is part of the subscriber's FSA. The MSC at step 34 sends the Directed Retry message to the fixed cellular telephone, and the fixed cellular telephone accesses over the access channel 60 the base station B4 of cell C4. In this event, if the redirection access function was not available to the telecommunication system, then the subscriber located within overlapping cell coverage including a cell within its fixed subscription area would not have been able to receive or place a call within the telecommunication system. This would have resulted in poor service being provided to the subscriber and loss of revenue to the operator. Clearly, the redirection access function of the present invention improves the service provided to the subscriber who has elected to pay a reduced cost for an FSA service.

It is thus believed that the operation and construction of the present invention will be apparent from the foregoing description. While the method and system shown and described has been characterized as preferred, it will be readily apparent that various changes and modifications could be made therein without departing from the spirit and scope of the invention as defined in the following claims.

What is claimed is:

1. A cellular telecommunications system having a plurality of cells and a plurality of subscribers, said plurality of subscribers including at least one fixed subscriber, said system comprising:

a mobile switching center (MSC);

a plurality of base stations electronically connected to said MSC, each of said base stations transmitting radio frequency signals over a coverage area defining one of said cells;

a plurality of cellular telephones of approximately the same radio frequency transmitter power which are utilized by said subscribers to access said cellular system;

a home location register HLR) for storing a subscriber profile for each of said plurality of subscribers, each subscriber profile identifying whether an associated subscriber is a fixed subscriber;

a fixed subscription area (FSA) defined in said HLR, said FSA including at least one of said cells, said fixed subscriber being allowed to access said system only through said at least one cell included in said FSA;

means for sending an inquiry from said M.C. to said HER to determine whether an accessing subscriber is a normal subscriber or fixed subscriber;

means for determining whether said fixed subscriber attempts to access said telecommunications system through a serving cell excluded from said FSA; and a redirection access function for redirecting said fixed subscriber to access said at least one cell included in said FSA upon determining that said fixed subscriber attempts to access said telecommunications system through a serving cell excluded from said FSA.

2. The cellular telecommunications system of claim 1 wherein the redirection access function is located within the MSC.

3. The cellular telecommunications system of claim 1 wherein the redirection access function includes means for determining if the redirection access function is active in said serving cell.

4. The cellular telecommunications system of claim 3 further comprising an access denial function for denying access of said fixed subscriber to said system upon determining that the redirection function is not active in said serving cell.

5. The cellular telecommunications system of claim 4 wherein the redirection access function includes means for determining if at least one neighbor cell to said serving cell is one of the cells in said FSA.

6. The cellular telecommunications system of claim 5 wherein the redirection access function includes means for redirecting fixed subscriber access from said serving cell to said at least one neighbor cell when said at least one neighbor cell is one of the cells in said FSA.

7. The cellular telecommunications system of claim 5 wherein the means for determining if said at least one neighbor cell is one of the cells in said FSA involves checking cells surrounding said serving cell.

8. The cellular telecommunications system of claim 5 wherein said access denial function includes means for denying access of said fixed subscriber to said system upon determining that the signal strength from said fixed subscriber to said neighbor cell is not sufficient for satisfactory call setup.

9. The cellular telecommunications system of claim 6 wherein the means for redirecting fixed subscriber access includes sending a message to said cellular telephone of said fixed subscriber identifying channels of said at least one neighbor cell.

10. The cellular telecommunications system of claim 6 wherein the means for redirecting fixed subscriber access includes sending a message to said cellular telephone of said fixed subscriber listing said at least one neighboring cell that is part of the subscriber's FSA.

11. The cellular telecommunications system of claim 6 wherein the redirection access function includes means for determining if signal strength from said fixed subscriber to said neighbor cell will result in satisfactory call setup.

12. The cellular telecommunications system of claim 6 further including notification means for notifying the fixed subscriber it is out of its FSA when no neighbor cells to the serving cell form part of its FSA.

13. A cellular telecommunications system serving a plurality of normal subscribers and a plurality of fixed subscribers, said normal and fixed subscribers having cellular telephones of approximately the same radio frequency transmitter power for accessing the system through a plurality of cells and a plurality of base stations electronically connected to a mobile switching center (MSC), each of said base stations transmitting radio frequency signals over a coverage area defining one of said cells; said system comprising:

a home location register (HLR) for storing a subscriber profile for each of said plurality of subscribers, each subscriber profile identifying whether an associated subscriber is a fixed subscriber;

means for sending an inquiry from said MSC to said HLR to determine whether an accessing subscriber is a normal subscriber or a fixed subscriber;

means for permitting said normal subscriber to setup a call in the system through any one of said plurality of cells;

means within said HLR for defining at least one of said plurality of cells to form a fixed subscription area (FSA);

means for permitting said fixed subscriber restricted call setup to the system through said FSA; and a redirect access means for redirecting access to the system by said fixed subscriber to one of said cells in said FSA when said fixed subscriber initially accesses the system through a serving cell excluded from the FSA.

14. The cellular telecommunications system of claim 13 wherein the redirection access function further includes means for determining if the redirection access function is active in said serving cell.

15. The cellular telecommunications system of claim 13 wherein the redirection access function further includes means for determining if at least one neighbor cell to said serving cell is one of the cells in said FSA.

16. The cellular telecommunications system of claim 15 wherein the redirection access function includes means for determining if signal strength from said fixed subscriber to said neighbor cell will result in satisfactory call setup.

17. The cellular telecommunications system of claim 15 wherein the redirection access function includes means for redirecting fixed subscriber access from said serving cell to said neighbor cell when said at least one neighbor cell is one of the cells in said FSA.

18. The cellular telecommunications system of claim 17 wherein the means for determining if said at least one neighbor cell is one of the cells in said FSA involves checking cells surrounding said serving cell.

19. The cellular telecommunications system of claim 17 wherein the means for redirecting fixed subscriber access includes sending a message to the cellular telephone of said fixed subscriber identifying channels of said at least one neighbor cell.

20. The cellular telecommunications system of claim 17 wherein the means for redirecting fixed subscriber access includes sending a message to the cellular telephone of said fixed subscriber listing said at least one neighboring cell that is part of the subscriber's FSA.

21. The cellular telecommunications system of claim 17 further comprising an access denial function for denying access of said fixed subscriber to said system upon determining that none of said neighbor cells is one of the cells in said FSA.

22. The cellular telecommunications system of claim 21 further including notification means for notifying the fixed subscriber when the fixed subscriber is out of the FSA when none of said neighbor cells is one of the cells in said FSA.

23. In a cellular telecommunications system having a plurality of cells and a plurality of subscribers utilizing a plurality of cellular telephones of approximately the same radio frequency transmitter power to access said cellular system, said plurality of subscribers including at least one fixed subscriber and being assigned restricted access to said system through a fixed subscription area (FSA) including at least one of said cells, a method of redirecting access of said fixed subscriber to said at least one cell included in said FSA when said fixed subscriber attempts to access said telecommunications system through a serving cell not forming part of the FSA, the method comprising the steps of:

defining in a home location register (HLR) which of said plurality of cells is included in said FSA;

determining whether at least one neighbor cell to the serving cell is one of the cells in the FSA;

defining, in a subscriber profile stored in said HLR, whether each of said plurality of subscribers is assigned to said FSA;

sending an inquiry from a serving mobile switching center (MSC) to said HLR to determine whether an accessing subscriber is a fixed subscriber assigned to said FSA;

denying access of said fixed subscriber to said system upon determining that the at least one neighbor cell is not one of the cells in the FSA; and redirecting access of said fixed subscriber from the serving cell to the at least one neighbor cell upon determining that the at least one neighbor cell is one of the cells in the FSA.

24. The method of redirecting access of said fixed subscriber to said system of claim 23 further including the step of:

determining whether the step of redirecting the subscriber access is active in said serving cell after the step of determining whether the fixed subscriber is accessing the system through the serving cell.

25. The method of redirecting access of said fixed subscriber to said system of claim 24 further including the step of determining if signal strength from said fixed subscriber to said neighbor cell will result in satisfactory call setup.

26. The cellular telecommunications system of claim 5 wherein said access denial function includes means for denying access of said fixed subscriber to said system upon determining that none of said neighbor cells is one of the cells in said FSA.

27. In a cellular telecommunications system serving a plurality of normal subscribers and a plurality of fixed subscribers, said normal and fixed subscribers having cellular telephones of approximately equal radio frequency transmission power for accessing the system through a plurality of cells and a plurality of base stations electronically connected to a mobile switching center (MSC), each of said base stations transmitting radio frequency signals over a coverage area defining one of said cells; a method for accessing the system comprising the steps of:

storing a subscriber profile in a home location register (HLR) for each of said plurality of subscribers, each subscriber profile identifying whether an associated subscriber is a fixed subscriber:

sending an inquiry from said MSC to said HLR to determine whether an accessing subscriber is a normal subscriber or a fixed subscriber:

permitting said normal subscriber to setup a call in the system through any one of said plurality of cells;

defining, within said HLR, at least one of said plurality of cells to form a fixed subscription area (FSA);

determining whether said fixed subscriber is attempting to access said system through one of said plurality of cells in said FSA;

permitting said fixed subscriber restricted call setup in the system upon determining that said subscriber is attempting to access said system through said FSA; and redirecting access to the system by said fixed subscriber to one of said cells in said FSA upon determining that said fixed subscriber initially accesses the system through a serving cell excluded from the FSA.

28. The method of claim 27 further including the steps of:

determining whether at least one neighbor cell to said serving cell is one of said cells in said FSA; and redirecting said fixed subscriber access to said at least one neighbor cell when said at least one neighbor cell is determined to be one of the cells in said FSA.

29. The method of claim 27 further including the step of determining if signal strength from said fixed subscriber to said neighbor cell will result in satisfactory call setup.

30. The method of claim 28 further including the step of determining whether the step of redirecting subscriber access is active in said serving cell after the step of determining whether the fixed subscriber is accessing the system through the serving cell.

31. The method of claim 28 wherein the step of determining whether said neighbor cell is one of the cells in said FSA includes the step of checking cells surrounding said serving cell.

* * * * *